(12) United States Patent
Mitamura

(10) Patent No.: US 12,730,347 B2
(45) Date of Patent: Sep. 8, 2026

(54) OPTICAL DEVICE, OPTICAL TRANSCEIVING DEVICE, AND OPTICAL TRANSCEIVER

(71) Applicant: FUJITSU OPTICAL COMPONENTS LIMITED, Kawasaki (JP)

(72) Inventor: Nobuaki Mitamura, Saitama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 236 days.

(21) Appl. No.: 18/394,665

(22) Filed: Dec. 22, 2023

(65) Prior Publication Data

US 2024/0264506 A1 Aug. 8, 2024

(30) Foreign Application Priority Data

Feb. 2, 2023 (JP) ................................ 2023-014877

(51) Int. Cl.

| | |
|---|---|
| ***G02F 1/21*** | (2006.01) |
| ***G02F 1/225*** | (2006.01) |
| ***H04B 10/40*** | (2013.01) |

(52) U.S. Cl.

CPC ............ *G02F 1/212* (2021.01); *G02F 1/2255* (2013.01); *H04B 10/40* (2013.01)

(58) Field of Classification Search

CPC ....................................................... G02F 1/212

See application file for complete search history.

(56) References Cited

U.S. PATENT DOCUMENTS

| | | | |
|---|---|---|---|
| 2005/0117834 A1 | 6/2005 | Joyner et al. | |
| 2012/0243820 A1* | 9/2012 | Hayakawa ............ | G02F 1/2255 385/2 |
| 2013/0334402 A1 | 12/2013 | Izuha et al. | |
| 2016/0246004 A1 | 8/2016 | Kachru et al. | |
| 2020/0012164 A1* | 1/2020 | Kitamura .............. | G02F 1/2257 |
| 2020/0271963 A1 | 8/2020 | Iwatsuka et al. | |
| 2021/0242268 A1 | 8/2021 | Yagi et al. | |
| 2021/0278708 A1 | 9/2021 | Kumar | |
| 2021/0356836 A1* | 11/2021 | Sugiyama ............... | G02F 1/212 |
| 2022/0057578 A1 | 2/2022 | Endo et al. | |
| 2022/0066093 A1 | 3/2022 | Kimura | |

FOREIGN PATENT DOCUMENTS

| | | |
|---|---|---|
| JP | 3-282519 | 12/1991 |
| JP | 2010-230978 | 10/2010 |
| JP | 2010-272592 | 12/2010 |
| JP | 2014-17468 | 1/2014 |
| JP | 2014-175282 | 9/2014 |
| JP | 2015-22224 | 2/2015 |
| JP | 2018-169435 | 11/2018 |
| JP | 2020-134874 | 8/2020 |
| JP | 2020-173408 | 10/2020 |
| JP | 2021-120695 | 8/2021 |
| JP | 2022-38756 | 3/2022 |

OTHER PUBLICATIONS

Japan Office Action issued in counterpart Japanese Application No. 2023-014877 dated Jul. 17, 2026.

* cited by examiner

*Primary Examiner* — Lisa M Caputo

(74) *Attorney, Agent, or Firm* — STAAS & HALSEY LLP

(57) ABSTRACT

An optical device includes a substrate having an optical waveguide formed on a substrate surface, a buffer layer that is laminated on the optical waveguide, an electrode that is formed on the buffer layer, an insulating layer that covers the electrode, and an adhesion layer that is formed between the electrode and the insulating layer.

11 Claims, 7 Drawing Sheets

OPTICAL DEVICE, OPTICAL TRANSCEIVING DEVICE, AND OPTICAL TRANSCEIVER

CROSS-REFERENCE TO RELATED APPLICATION

This application is based upon and claims the benefit of priority of the prior Japanese Patent Application No. 2023-014877, filed on Feb. 2, 2023, the entire contents of which are incorporated herein by reference.

FIELD

The embodiments discussed herein are related to an optical device, an optical transceiving device, and an optical transceiver.

BACKGROUND

For example, with the rapid increase in the volume of Internet Protocol (IP) data communication, increase in capacity of optical networks have been desired. In addition, to increase spatial accommodation efficiency of an optical transceiver, further miniaturization of an optical modulator is expected.

FIG. 9 is a cross-sectional schematic diagram illustrating an example of a conventional optical device. An optical device 200 illustrated in FIG. 9 is an optical device that has a coherent optical modulator, such as of dual polarization-quadrature phase shift keying (DP-QPSK), incorporated therein. The optical device 200 has an airtight casing structure with an airtight sealing package 201 and a lid 202, and houses an optical modulator chip 203 thereinside. The optical modulator chip 203 is bonded and fixed to a bottom surface of the airtight sealing package 201.

The optical device 200 includes an airtight sealing pipe 204, a block 205, a collimator lens 206, a polarization rotator (PR) 207, and a polarization beam combiner (PBC) 208. Furthermore, the optical device 200 includes an airtight sealing window 209, a condensing lens 210, and a ferrule 211.

The airtight sealing pipe 204 is a metal pipe to insert an input-side optical fiber 221 into the airtight sealing package 201. The block 205 is a portion to optically couple the input-side optical fiber 221 inserted into the airtight sealing pipe 204 and an optical waveguide 203A in the optical modulator chip 203 by butt joint connection. The ferrule 211 is a crimp terminal to mount an output-side optical fiber 222 on the optical device 200.

The optical modulator chip 203 is an optical modulator device that modulates a signal light from the input-side optical fiber 221 by an electrical signal, and outputs a modulated light. The collimator lens 206 is a lens that converts the modulated light from the optical modulator chip 203 into parallel light. The PR 207 is a polarization rotating unit that rotates the polarization of modulated light of parallel light from the collimator lens 206. The PBC 208 is a polarization multiplexing unit that performs polarization multiplication of modulated light with polarization rotation and modulated light without polarization rotation. The PBC 208 collects modulated light subjected to polarization multiplexing through the airtight sealing window 209 to the condensing lens 210. The condensing lens 210 is a lens that outputs condensed modulated light to the output-side optical fiber 222.

By welding the airtight sealing package 201 and the lid 202, the airtight sealing package 201 is airtightly sealed. An inner surface of the airtight sealing pipe 204 is sealed with gold plating and solder formed on a surface of the input-side optical fiber 221. Furthermore, as for the airtight sealing window 209 also, gold plating formed on a surface of the airtight sealing window 209 and the airtight sealing package 201 are airtightly sealed with silver brazing. The optical modulator chip 203 has plural Mach-Zehnder modulators (MZM) incorporated therein.

FIG. 10 is a cross-sectional schematic diagram illustrating an example of an MZM 240 in the optical modulator chip 203. The MZM 240 illustrated in FIG. 10 is an MZM in the optical modulator chip 203. The MZM 240 includes an Si substrate not illustrated, an intermediate layer 231 that is formed on the Si substrate, an optical waveguide 232 that is formed on the intermediate layer 231, and a buffer layer 233 that is formed on the optical waveguide 232. Furthermore, the MZM 240 includes a signal electrode 235A (235) formed on a buffer layer 233 and a ground electrode 235B (235).

The intermediate layer 231 is a layer formed by, for example, $SiO_2$. The optical waveguide 232 is a ridge waveguide that has, for example, a ridge 232A and a slab 232B. The optical waveguide 232 is an optical waveguide that is formed by, for example, $LiNbO_3$ (hereinafter, referred to as LN). The optical waveguide 232 is arranged such that the ridge 232A is positioned between the signal electrode 235A and the ground electrode 235B. The bugger layer 233 is a layer that is formed by, for example, $SiO_2$.

Because $SiO_2$ that forms the intermediate layer 231 and the buffer layer 233 has a refractive index lower than LN that forms the optical waveguide 232, light is confined in the optical waveguide to be propagated.

The signal electrode 235A and the ground electrode 235B are constituted of an Au electrode layer 237, and the buffer layer 233 and the Au electrode layer 237 are joined by an electrode adhesion layer 234. For the electrode adhesion layer 234, for example, Ti is often used (for example, Japanese Laid-open Patent Publication Nos. 2020-173408 and 2015-22224, US Patent Application Publication No. 2016/0246004).

In recent years, small form-factor coherent optical transceivers, such as of quad small form-factor pluggable (QSFP) 56DD, with a 96 Gbaud/second have been available. However, in the future, even for next-generation optical transceivers with a high baud rate of 130 Gbaud/second, there is a demand for miniaturization of the sizes of QSFP 56DD. To accommodate an optical modulator in a small optical transceiver, besides miniaturizing the optical modulator chip 203 by designing with ingenuity, a method of making it an on-board type in which it is simply fixed to a metal plate instead of placing it in the airtight sealing package 201 can be considered. Accordingly, the airtight sealing package 201 that is adopted in a conventional technique becomes unnecessary in the on-board optical device and, therefore, the workload related to airtight sealing can be reduced.

However, in the on-board optical device, because of its non-airtight sealing structure, there are concerns about adverse effects on the lifetime of DC drift due to moisture absorption in the buffer layer 233, delamination due to hydroxylation of the electrode adhesion layer 234 of Ti or the like. Additionally, in the on-board optical device, a short circuit between the signal electrode 235A and the ground electrode 235B can occur due to adhesion of conductive impurities to a portion between the signal electrode 235A and the ground electrode 235B. Therefore, for the on-board optical device, the reality is that ensuring reliability without airtight sealing is required.

SUMMARY

According to an aspect of an embodiment, an optical device includes a substrate, a buffer layer, an electrode, an insulating layer and an adhesion layer. The substrate has an optical waveguide formed on a substrate surface. The buffer layer is laminated on the optical waveguide. The electrode is formed on the buffer layer. The insulating layer covers the electrode. The adhesion layer is formed between the electrode and the insulating layer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The inventor of the present invention propose an optical device that can suppress an influence of non-airtight sealing by forming an insulating layer made from $SiO_2$ on an entire surface of an optical modulator chip including a portion between a signal electrode and a ground electrode. However, the inventor found a problem that when the signal electrode and the ground electrode are Au electrodes having low resistance, because Au is highly inert, the insulating layer of $SiO_2$ does not adhere to Au and the insulating layer easily peels off from the Au electrode.

Preferred embodiments of the present invention will be explained with reference to accompanying drawings. The present embodiment is not intended to limit the disclosed technique. Moreover, the respective embodiments may be appropriately combined within a range not causing a contradiction.

(a) First Embodiment

Figure 1:
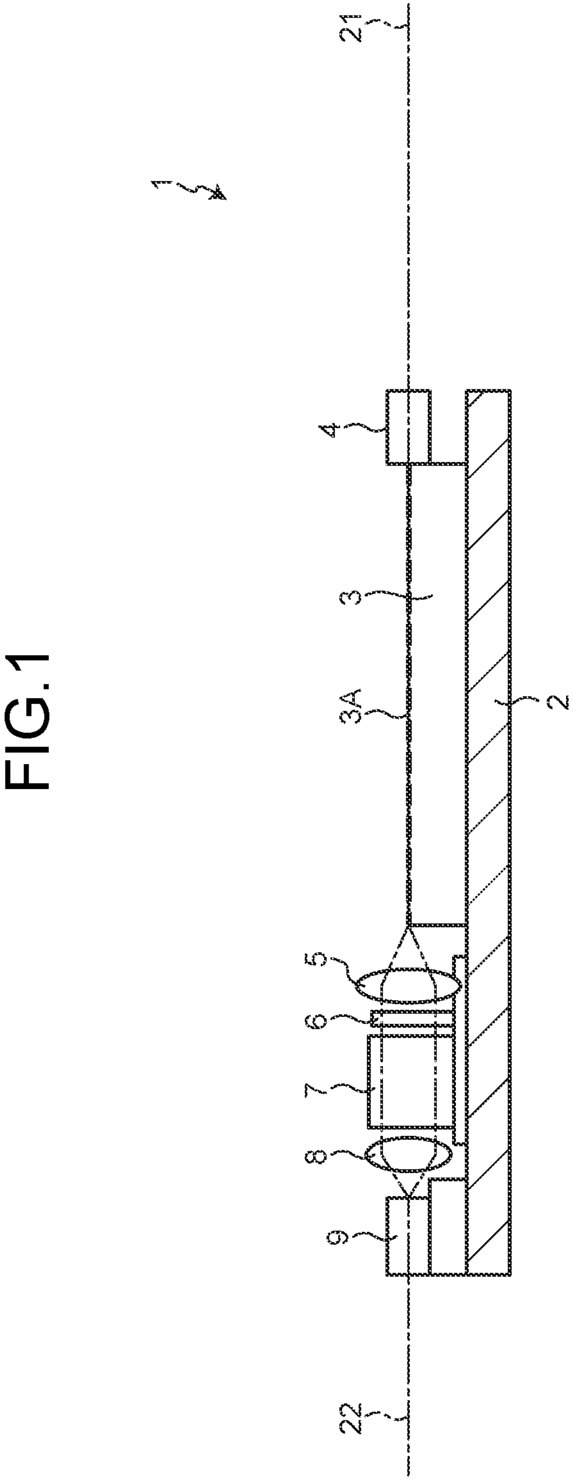
FIG. 1 is a cross-sectional schematic diagram illustrating an example of an optical device of a present embodiment.

FIG. 1 is a cross-sectional schematic diagram illustrating an example of an optical device 1 of the present embodiment. The optical device 1 illustrated in FIG. 1 is, for example, an optical device that has a coherent optical modulator, such as of DPQPSK, incorporated therein, and is a non-airtight sealing on-board optical device. The optical device 1 includes a metal plate 2, an optical modulator chip 3, a block 4, a collimator lens 5, a PR 6, a PBC 7, a condensing lens 8, and a ferrule 9. These parts, such as the optical modulator chip 3, the block 4, the collimator lens 5, the PR 6, the PBC 7, the condensing lens 8, and the ferrule 9, are mounted on the metal plate 2.

The block 4 is a portion to optically couple an input-side optical fiber 21 and an optical waveguide 3A in the optical modulator chip 3 by butt joint connection. The ferrule 9 is a crimp terminal to mount an output-side optical fiber 22 on the optical device 1.

The optical modulator chip 3 modulates a signal light from the input-side optical fiber 21 by an electrical signal, and outputs modulated light. The collimator lens 5 is a lens that converts the modulated light from the optical modulator chip 3 into parallel light. The PR 6 is a polarization rotating unit that rotates the polarization of modulated light of parallel light from the collimator lens 5. The PBC 7 is a polarization multiplexing unit that performs polarization multiplication of modulated light with polarization rotation and modulated light without polarization rotation. The PBC 7 collects modulated light subjected to polarization multiplexing to the condensing lens 8. The condensing lens 8 is a lens that outputs condensed modulated light into the output-side optical fiber 22.

Figure 2:
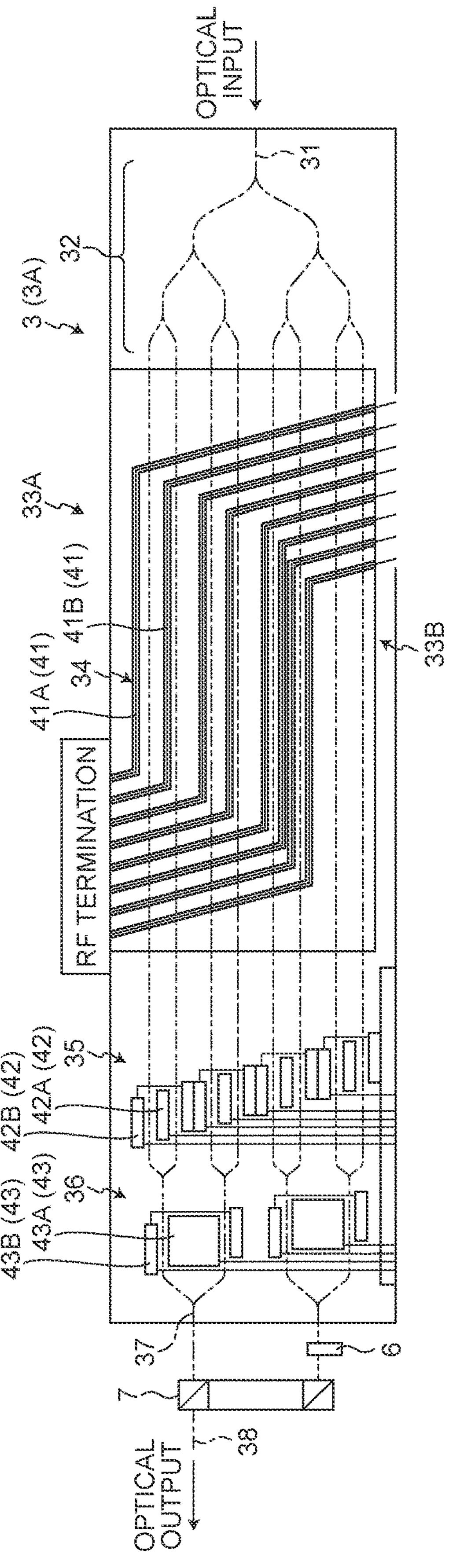
FIG. 2 is a planar schematic diagram illustrating an example of an optical modulator chip.

FIG. 2 is a planar schematic diagram of the optical modulator chip 3. The optical modulator chip 3 illustrated in FIG. 2 includes an optical waveguide 3A, an optical input unit 31, a splitting unit 32, an X-polarization MZM 33A, and a Y-polarization MZM 33B. The optical modulator chip 3 includes a PR 6, a PBC 7, and an optical output unit 38.

The optical input unit 31 inputs laser light from a light source not illustrated. The splitting unit 32 splits the laser light from the optical input unit 31, and outputs the laser light subjected to optical splitting to the X-polarization MZM 33A and the Y-polarization MZM 33B.

The X-polarization MZM 33A subjects the laser light split by the splitting unit 32 to quadrature phase modulation by an X-polarized data signal, and outputs a signal light of a IQ component of the X-porlarized wave to the PBC 7. The Y-polarization MZM 33B subjects the laser light split by the splitting unit 32 to quadrature phase modulation by a Y-polarized data signal, and outputs a signal light of a Y-polarized IQ component to the PR 6. The PR 6 rotates polarization of the signal light of the Y-polarized IQ component from the Y-polarization MZM 33B, to convert into a signal light of the X-polarized IQ component, and outputs the signal light of the X-polarized IQ component obtained by conversion to the PBC 7. Furthermore, the PBC 7 multiplexes the signal light of the X-polarized IQ component from the X-polarization MZM 33A and the signal light of the X-polarized IQ component obtained by conversion from the PR 6, and outputs polarization-multiplexed signal light to the optical output unit 38.

The X-polarization MZM 33A includes two units of RF-side MZMs 34, two units of DC-side child MZMs 35, a DC-side parent MZM 36, and a multiplexing unit 37.

The RF-side MZM 34 includes a signal electrode 41A and a ground electrode 41B. The signal electrode 41A and the ground electrode 41B are electrodes 41 that are formed by a metal material, such as Au. The RF-side MZM 34 modulates the laser light at high speed according to a high speed signal from the signal electrode 41A to the ground electrode 41B, and outputs the laser light subjected to high speed modulation to the DC-side child MZM 35.

One of the DC-side child MZMs 35 includes a signal electrode 42A and a ground electrode 42B. The signal electrode 42A and the ground electrode 42B are electrodes 42 that are formed by a metal material, such as Au. The DC-side child MZM 35 phase modulates the laser light subjected to high speed modulation according to a data signal from the signal electrode 42A to the ground electrode 42B, and outputs a signal light of an I component after phase modulation to the DC-side parent MZM 36.

The other one of the DC-side child MZMs 35 includes the signal electrode 42A and the ground electrode 42B. The signal electrode 42A and the ground electrode 42B are the electrodes 42 that are formed by a metal material, such as Au. The DC-side child MZM 35 phase modulates the laser light subjected to high speed modulation according to a data signal from the signal electrode 42A to the ground electrode 42B, and outputs a signal light of a Q component after phase modulation to the DC-side parent MZM 36.

The DC-side parent MZM 36 includes a signal electrode 43A and a ground electrode 43B. The signal electrode 43A and the ground electrode 43B are electrodes 43 that are formed by a metal material, such as Au. One of the DC-side parent MZMs 36 quadrature modulates the signal light of the phase-modulated I component according to a driving voltage signal from the signal electrode 43A to the ground electrode 43B, and outputs the signal light of the X-polarized I component after quadrature modulation to the multiplexing unit 37. The other one of the DC-side parent MZMs 36 includes the signal electrode 43A and the ground electrode 43B. The signal electrode 43A and the ground electrode 43B are electrodes 43 that are formed by a metal material, such as Au. The other one of the DC-side parent MZMs 36 quadrature modulates the signal light of the phase-modulated Q component according to a driving voltage signal from the signal electrode 43A to the ground electrode 43B, and outputs the signal light of the X-polarized Q component after quadrature modulation to the multiplexing unit 37.

The multiplexing unit 37 multiplexes the signal light of the X-polarized I component from one of the DC-side parent MZMs 36 and the signal light of the X-polarized Q component from the other one of the DC-side parent MZMs 36, and outputs a signal light of the X-polarized IQ components after multiplexing to the PBC 7.

The Y-polarization MZM 33B includes two units of the RF-side MZMs 34, two units of the DC-side child MZMs 35, the DC-side parent MZM 36, and the multiplexing unit 37

The RF-side MZM 34 includes the signal electrode 41A and the ground electrode 41B. The RF-side MZM 34 modulates the laser light at high speed according to a high speed signal from the signal electrode 41A to the ground electrode 41B, and outputs the laser light subjected to high speed modulation to the DC-side child MZM 35.

One of the DC-side child MZM 35 includes the signal electrode 42A and the ground electrode 42B. The DC-side child MZM 35 phase modulates the laser light subjected to high speed modulation according to a data signal from the signal electrode 42A to the ground electrode 42B, and outputs a signal light of an I component after phase modulation to the DC-side parent MZM 36.

The other one of the DC-side child MZM 35 includes the signal electrode 42A and the ground electrode 42B. The DC-side child MZM 35 phase modulates the laser light subjected to high speed modulation according to a data signal from the signal electrode 42A to the ground electrode 42B, and outputs a signal light of a Q component after phase modulation to the DC-side parent MZM 36.

The DC-side parent MZM 36 includes the signal electrode 43A and the ground electrode 43B. The DC-side parent MZM 36 quadrature modulates the signal light of the phase-modulated I component according to a driving voltage signal from the signal electrode 43A to the ground electrode 43B, and outputs the signal light of the Y-polarized I component after quadrature modulation to the multiplexing unit 37. The DC-side parent MZM 36 quadrature modulates the signal light of the phase-modulated Q component according to a driving voltage signal from the signal electrode 43A to the ground electrode 43B, and outputs the signal light of the Y-polarized Q component after quadrature modulation to the multiplexing unit 37.

The multiplexing unit 37 multiplexes the signal light of the Y-polarized I component from the other one of the DC-side parent MZMs 36 and the signal light of the Y-polarized Q component from one of the DC-side parent MZMs 36. The multiplexing unit 37 outputs a signal light of the Y-polarized IQ components after multiplexing to the PR 6. The PR 6 rotates polarization of the signal light of the Y-polarized IQ component from the multiplexing unit 37, and outputs the signal light of the X-polarized IQ component obtained by polarization rotation to the PBC 7. The PBC 7 polarization-multiplexes the signal light of the X-polarized IQ component from the multiplexing unit 37 and the signal light of the X-polarized IQ component obtained from the PR 6, and outputs polarization-multiplexed signal light to the optical output unit 38.

Figure 3:
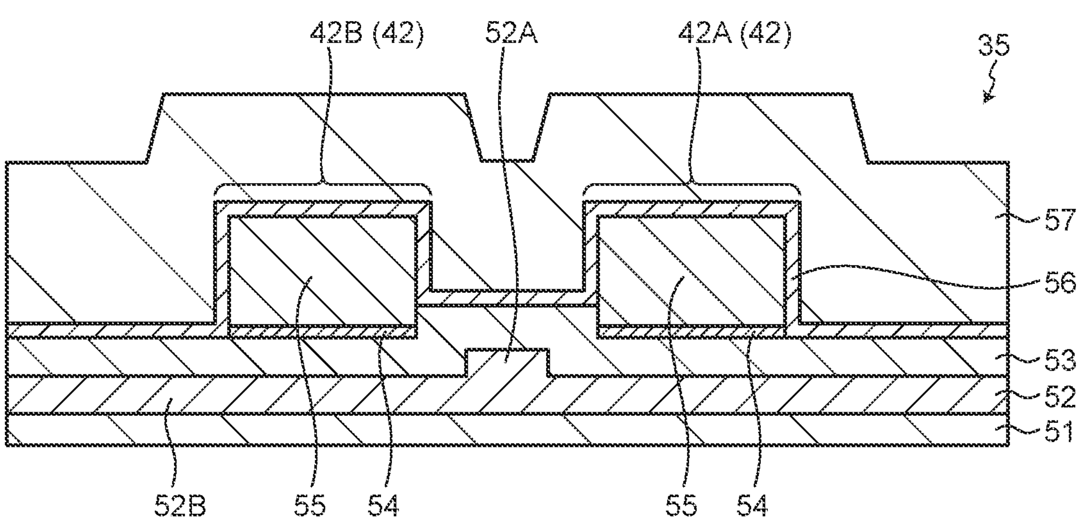
FIG. 3 is a cross-sectional schematic diagram illustrating an example of a DC-side child MZM of a first embodiment.

FIG. 3 is a cross-sectional schematic diagram illustrating an example of the DC-side child MZM 35 of a first embodiment. The DC-side child MZM 35 illustrated in FIG. 3 includes a substrate not illustrated, an intermediate layer 51 laminated on the substrate, a optical waveguide 52 that is laminated on the intermediate layer 51, a buffer layer 53 that is laminated on the optical waveguide 52, and the signal electrode 42A and the ground electrode 42B formed on the buffer layer 53. The DC-side child MZM 35 includes a buffer layer 53, an adhesion layer 56 that is formed on the signal electrode 42A and the ground electrode 42B, and an insulating layer 57 laminated on the adhesion layer 56.

The substrate is, for example, an Si substrate. The intermediate layer 51 is a layer formed by, for example, $SiO_2$. The optical waveguide 52 is an optical waveguide composed mainly of, for example, $LiNbO_3$ (hereinafter, referred to as LN). The optical waveguide 52 is not limited to LN and, for example, AlGaAsP, InGaAsP, Si, or the like may be applicable, and appropriate alteration is possible. The optical waveguide 52 is a ridge waveguide having a ridge 52A and a slab 52B. The optical waveguide 52 has the ridge 52A arranged between the signal electrode 42A and the ground electrode 42B. The buffer layer 53 is a cladding layer that is formed by, for example, $SiO_2$.

The signal electrode 42A and the ground electrode 42B are the electrodes 42 that include an Au electrode layer 55 and an electrode adhesion layer 54. The Au electrode layer 55 is an electrode layer that is mainly composed of Au. The electrode adhesion layer 54 is a layer that is composed mainly of, for example, ZnS, and that joins the Au electrode layer 55 and the buffer layer 53. The adhesion layer 56 is a protective film that is composed mainly of, for example, ZnS, and that protects a surface of the buffer layer 53 and the Au electrode layer 55. ZnS is an insulating material that adheres strongly also to the inert Au electrode layer 55 that is less prone to adhesion of films, and has high adhesion also to the insulating layer 57 of $SiO_2$ on ZnS. The adhesion layer 56 is not limited to ZnS, and a mixture of ZnS and $SiO_2$ is also applicable, and appropriate alteration is possible. The insulating layer 57 is a layer that is mainly composed of, for example, $SiO_2$ and that insulates a surface of the adhesion layer 56. Because the insulating layer 57 on the adhesion layer 56 has high adhesion to ZnS, it can be formed to be approximately 1 μm to 4 μm thick, and a short circuit between the electrodes 42 due to adhesion of conductive impurities can be prevented while maintaining sufficient dielectric strength of the adhesion layer 56.

FIG. 3 illustrates the signal electrode 42A and the ground electrode 42B of the DC-side child MZM 35 as an example, but it is also applicable to the signal electrode 41A and the ground electrode 41B in the RF-side MZM 34, and the signal electrode 43A and the ground electrode 43B in the DC-side parent MZM 36.

Next, the adhesion layer 56 of ZnS is formed in thickness of approximately 5 nm to 100 nm on the surface of the Au electrode layer 55 and the buffer layer 53 in the optical modulator chip 3 of the first embodiment. The adhesion layer 56 can be formed easily by a physical vapor deposition (PVD) method such as RF sputtering, by using a target made from, for example, ZnS. In this process, Ar gas is used for RF spattering, but by increasing the Ar sputtering pressure to approximately 0.1 Pa to 1 Pa, the average mean free path of ZnS particles becomes shorter to improve circumvention (step coverage), and the ZnS film is to be formed also on a side surface of the Au electrode layer 55.

Moreover, for example, a ZnS film can also be formed by atomic layer deposition (ALD) by using either one of diethyl zinc ($Zn(CH_2CH_3)2$), zinc chloride ($ZnCl_2$), and zinc iodide ($ZnI_2$) and hydrogen sulfide ($H_2S$) gas as precursors. In this case, circumvention (step coverage) is further improved compared to the case of RF sputtering, and the ZnS film is to be formed also on the side surface of the Au electrode layer 55.

Subsequently, on the adhesion layer 56 made from ZnS, the insulating layer 57 made from $SiO_2$ is formed in film thickness of approximately 1 μm to 4 μm. The insulating layer 57 made from $SiO_2$ can be formed easily by PVD, such as DC sputtering using Si as a target and RF sputtering using $SiO_2$ as a target.

The adhesion layer 56 made from ZnS of the first embodiment has high adhesion to the Au electrode layer 55 and the insulating layer 57 of $SiO_2$, and is not to peel off from the Au electrode layer 55. Moreover, because the insulating layer 57 made from $SiO_2$ having thick film of approximately 1 μm to 4 μm is formed on the Au electrode layer 55, it has sufficient dielectric strength even when a voltage of a few volts to several tens of volts are applied. Therefore, when the on-board non-airtight sealing structure is applied, even if conductive impurities are adhered to a portion between the signal electrode 42A and the ground electrode 42B, a short circuit between the signal electrode 42A and the ground electrode 42B can be prevented. That is, even for the on-board optical device 1, reliability is ensured without airtight sealing.

Because ZnS itself, which is the adhesion layer 56 to the Au electrode layer 55, is also an insulating film, it can be used as a substitute for the insulating layer 57 of $SiO_2$ by making the ZnS film thick to approximately 1 μm to 4 μm, and appropriate alteration is possible. In this case, the insulating layer 57 of $SiO_2$ becomes unnecessary.

In the present embodiment, a configuration in which the signal electrode 42A having the Au electrode layer 55 and the electrode adhesion layer 54 and the ground electrode 42B are applied to the optical modulator has been explained as an example, but it can also be applied to signal electrodes and ground electrodes in an optical receiver, an optical attenuator, and a heater.

(b) Second Embodiment

Figure 4:
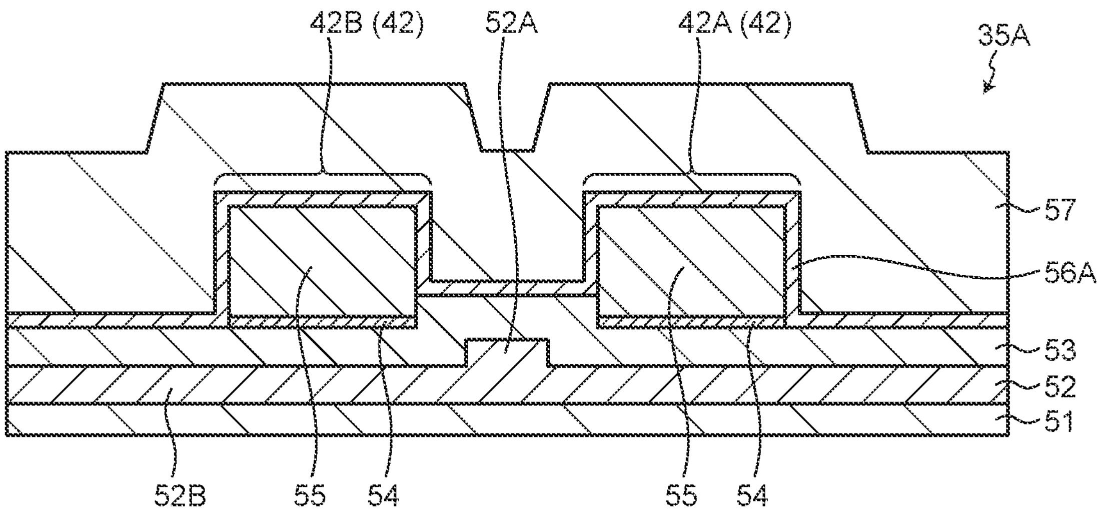
FIG. 4 is a cross-sectional schematic diagram illustrating an example of a DC-side child MZM of a second embodiment.

FIG. 4 is a cross-sectional schematic diagram illustrating an example of a DC-side child MZM 35A of a second embodiment. By assigning identical reference symbols to identical components to those in the optical device 1 of the first embodiment, explanation of duplicated configurations and actions will be omitted. What is different between the DC-side child MZM 35A illustrated in FIG. 4 and the DC-side child MZM 35 illustrated in FIG. 3 is a point in which an adhesion layer 56A that are composed of a mixture of ZnS and $SiO_2$ is formed between the Au electrode layer 55 and the insulating layer 57 in place of the adhesion layer 56.

On the buffer layer 53 and the Au electrode layer 55, the adhesion layer 56A that is composed of a mixture of ZnS and $SiO_2$ is formed in film thickness of approximately 5 nm to 100 nm. The adhesion layer 56A composed of the mixture of ZnS and $SiO_2$ can be formed easily by so-called dual sputtering in which a film is formed by RF sputtering by using a target made from ZnS and a film is formed by RF sputtering by using a target made from $SiO_2$. In this process, by setting an RF power applied to the respective targets of ZnS and $SiO_2$ to an appropriate value, and by adjusting the deposition rate of ZnS and $SiO_2$ to an appropriate ratio, the mixing ratio of ZnS and $SiO_2$ can be adjusted to the desired mixing ratio. By adjusting the mixing ratio of ZnS and $SiO_2$ to about 80:20, the water vapor permeability is reduced. Therefore, in addition to the effect of the first embodiment, effects of preventing adverse effects on the lifetime of DC drift due to moisture absorption in the buffer layer 53, and delamination due to oxidization or hydroxylation of the electrode adhesion layer 54 of Ti or the like can also be obtained.

Subsequently, similarly to the first embodiment, the insulating layer 57 made from $SiO_2$ is formed in film thickness of approximately 1 μm to 4 μm by RF sputtering on the adhesion layer 56A composed of the mixture of ZnS and $SiO_2$.

Because the adhesion layer 56A composed of the mixture of ZnS and $SiO_2$ of the second embodiment contains a lot of ZnS, it has high adhesion to the Au electrode layer 55 and the insulating layer 57, and is not to peel off from the Au electrode layer 55. Moreover, because the insulating layer 57 made from $SiO_2$ in thick film of approximately 1 μm to 4 μm is formed on the Au electrode layer 55, it has sufficient dielectric strength even when a voltage of a few volts to several tens of volts is applied. Therefore, when the on-board non-airtight sealing structure is applied, a short circuit between the signal electrode 42A and the ground electrode 42B can be prevented even if conductive impurities are adhered to a portion between the signal electrode 42A and the ground electrode 42B.

Furthermore, by adjusting the mixing ratio of ZnS and $SiO_2$ to about 80:20, the water vapor permeability is reduced in the adhesion layer 56A. Therefore, effects of preventing adverse effects on the lifetime of DC drift due to moisture absorption in the buffer layer 53, and delamination due to oxidization or hydroxylation of the electrode adhesion layer 54 of Ti or the like can be obtained.

Under the adhesion layer 56A composed of the mixture of ZnS and $SiO_2$, the adhesion layer 56 made from ZnS may be added similarly to the first embodiment. In this case, the adhesion between the Au electrode layer 55 and the adhesion layer 56 further increases.

In addition, in dual sputtering of ZnS and $SiO_2$, a film is formed only with ZnS by RF sputtering, by opening a shutter on only the ZnS target side while maintaining plasma generation on the targets of ZnS and $SiO_2$ up to approximately 2 nm to 20 nm in the early stage of deposition. It is also possible to perform RF dual sputtering of ZnS and $SiO_2$ by opening a shutter on the $SiO_2$ target side also partway through it. In this case, because the adhesion between the Au electrode layer 55 and the adhesion layer 56A increases, and there is no interface between ZnS and the mixture film of ZnS and $SiO_2$, peel off on the interface between ZnS and the mixture film of ZnS and $SiO_2$ does not occur at all. Because the mixture film of ZnS and $SiO_2$, which is the adhesion layer 56A to the Au, is also an insulating film, it can be used as a substitute for the $SiO_2$ film by making the mixture film of ZnS and $SiO_2$ thick to approximately 1 μm to 4 μm. In this case, the insulating layer 57 of the $SiO_2$ film becomes unnecessary. That is, even in the on-board optical device 1, reliability can be ensured without airtight sealing.

A case of applying to the signal electrode 42A and the ground electrode 42B of the DC-side child MZM 35A has been explained as an example, but it can also be applied to the signal electrode 41A and the ground electrode 41B in the RF-side MZM 34 and the signal electrode 43A and the ground electrode 43B in the DC-side parent MZM 36.

(c) Third Embodiment

Figure 5:
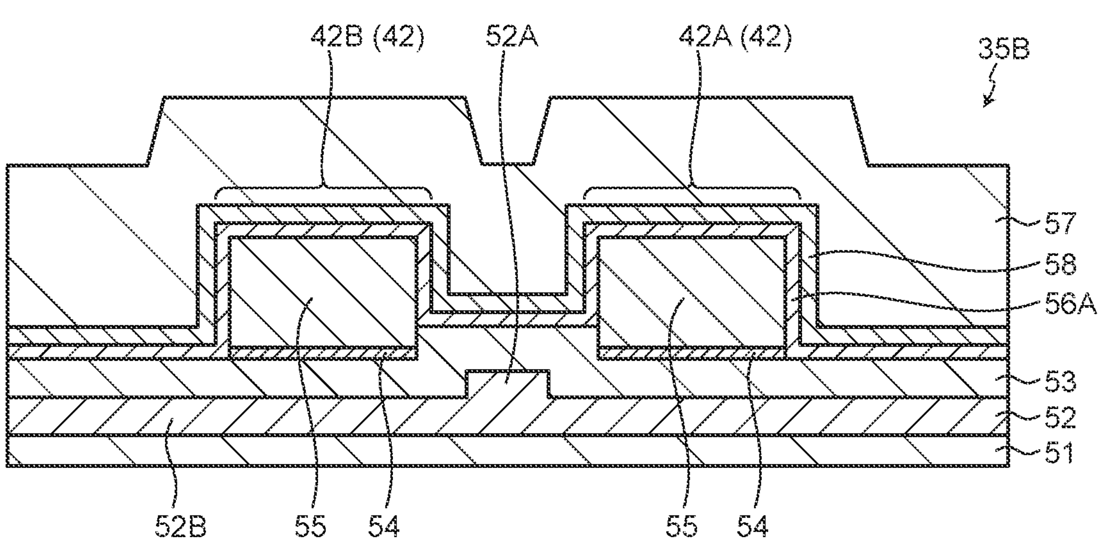
FIG. 5 is a cross-sectional schematic diagram illustrating an example of a DC-side child MZM of a third embodiment.

FIG. 5 is a cross-sectional schematic diagram illustrating an example of a DC-side child MZM 35B of a third embodiment. By assigning identical reference symbols to identical components to those in the optical device 1 of the second embodiment, explanation of duplicated configurations and actions will be omitted. What is different between the DC-side child MZM 35B illustrated in FIG. 5 and the DC-side child MZM 35A illustrated in FIG. 4 is a point in which a water-vapor barrier layer 58 is formed between the adhesion layer 56A and the insulating layer 57.

The adhesion layer 56A is formed with the mixture ratio of ZnS and $SiO_2$ adjusted to 80:20, and with film thickness of, for example, approximately 5 nm to 100 nm. The water-vapor barrier layer 58 is constituted of, for example, $Al_2O_3$, and is formed in film thickness of approximately 10 μm to 100 μm. The water-vapor barrier layer 58 is formed by atomic layer deposition (ALD) using, for example, trimethyl aluminum (TMA) as a metal precursor. As a result, circumvention (step coverage) is significantly preferable, and it can be formed into a precise film with significantly low water vapor permeability.

The adhesion layer 56A is formed with the mixture ratio of ZnS and $SiO_2$ adjusted to 80:20, and with film thickness of, for example, approximately 5 nm to 100 nm on the Au electrode layer 55 and the buffer layer 53 by RF dual sputtering. Subsequently, on the adhesion layer 56A with the 80:20 mixture ratio of ZnS and $SiO_2$, the water-vapor barrier layer 58 composed of $Al_2O_3$ is formed in film thickness of approximately 10 μm to 100 μm. The water-vapor barrier layer 58 is formed by atomic layer deposition using, for example, trimethyl aluminum (TMA) as a metal precursor.

Furthermore, similarly to the first embodiment and the second embodiment, on the water-vapor barrier layer 58, the insulating layer 57 made from $SiO_2$ is formed in film thickness of, for example, approximately 1 μm to 4 μm by RF sputtering.

Because the adhesion layer 56A composed of the mixture of ZnS and $SiO_2$ of the third embodiment contains a lot of Zns, it has high adhesion to the Au electrode layer 55, the buffer layer 53 ($SiO_2$), and the water-vapor barrier layer 58 ($Al_2O_3$), and is not to peel off from the Au electrode layer 55. Moreover, because the insulating layer 57 made from $SiO_2$ in thick film of approximately 1 μm to 4 μm is formed on the Au electrode layer 55, it has sufficient dielectric strength even when a voltage of a few volts to several tens of volts is applied. Therefore, when the on-board non-airtight sealing structure is applied, a short circuit between the signal electrode 42A and the ground electrode 42B can be prevented even if conductive impurities are adhered to a portion between the signal electrode 42A and the ground electrode 42B.

In the optical device 1, because the insulating adhesion layer 56A having high adhesion to the Au electrode layer 55 is formed on the Au electrode layer 55, it is possible to prevent adverse effects on the lifetime of DC drift due to moisture absorption in the buffer layer 53, and delamination due to hydroxylation of Ti or the like in the electrode adhesion layer 54. Furthermore, it is possible to prevent occurrence of a short circuit between the signal electrode 42A and the ground electrode 42B due to adhesion of conductive impurities. That is, even for the on-board optical device 1, reliability can be secured without airtight sealing.

Furthermore, on the mixture film of ZnS and $SiO_2$ with approximately 80:20 ratio, the water-vapor barrier layer 58 having low water vapor permeability formed by ALD is further formed. Therefore, an effect of preventing adverse effects on the lifetime of DC drift due to moisture absorption in the buffer layer 53 and delamination due to oxidization or hydroxylation of Ti or the like in the electrode adhesion layer 54 can be obtained. In addition, because the $Al_2O_3$ film, which is the water-vapor barrier layer 58, itself is also an insulating film, it can be used as a substitute for the $SiO_2$ film by making the $Al_2O_3$ film thick to approximately 1 μm to 4 μm. In this case, the insulating layer 57 of the $SiO_2$ becomes unnecessary.

Moreover, in the present embodiment, it is arranged in order, from the substrate, of Au, the adhesion layer 56A composed of the mixture film of ZnS and $SiO_2$, the water-vapor barrier layer 58 composed of $Al_2O_3$, and then the insulating layer 57 composed of $SiO_2$. However, because the $Al_2O_3$ film is also an insulating layer, it may be arranged from the substrate in order of Au, the adhesion layer 56A composed of the mixture film of ZnS and $SiO_2$, the insulating layer 57 composed of an $SiO_2$ film, and then the water-vapor barrier layer 58 composed of $Al_2O_3$, and appropriate alteration is possible.

A case of applying to the signal electrode 42A and the ground electrode 42B of the DC-side child MZM 35B has been explained as an example, but it is also applicable to the signal electrode 41A and the ground electrode 41B in the RF-side MZM 34, or the signal electrode 43A and the ground electrode 43B in the DC-side parent MZM 36.

(d) Fourth Embodiment

Figure 6:
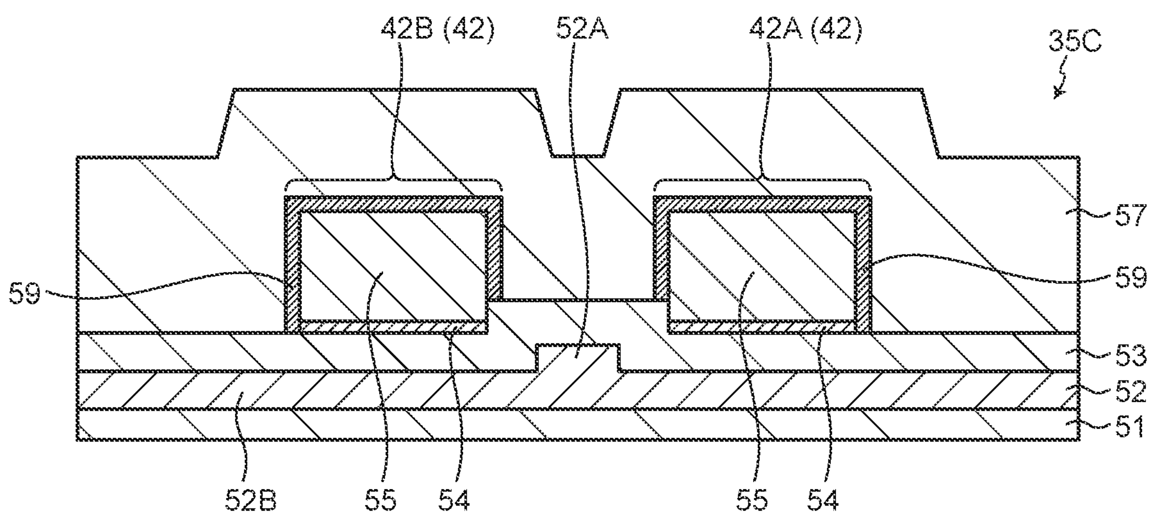
FIG. 6 is a cross-sectional schematic diagram illustrating an example of a DC-side child MZM of a fourth embodiment.

FIG. 6 is a cross-sectional schematic diagram illustrating an example of a DC-side child MZM 35C of a fourth embodiment. By assigning identical reference symbols to identical components to those in the optical device 1 of the first embodiment, explanation of duplicated configurations and actions will be omitted. What is different between the DC-side child MZM 35C illustrated in FIG. 6 and the DC-side child MZM 35 illustrated in FIG. 3 is a point in which a Pt adhesion layer 59 is formed on a surface of the Au electrode layer 55 formed on the buffer layer 53.

Pt can be used as an electrode having low electrical resistance, and in addition to its insusceptibility to corrosion by moisture in the air or the like, adhesion to an oxide, such as $SiO_2$, is higher than Au. The Pt adhesion layer 59 can be easily formed selectively only on the Au electrode layer 55 and the electrode adhesion layer 54 of Ti by, for example, electroless plating.

Moreover, for example, a Pt film can also be formed by ALD by using either one of oxygen, hydrogen, nitrogen, and ammonium, and (methylcyclopentadienyl) timothy platinum gas as precursors. In this case also, because ALD gives preferable circumvention (step coverage), and the Pt film is to be formed sufficiently also on the side surface of the Au electrode layer 55.

Subsequently, on the Pt adhesion layer 59 and the buffer layer 53, the insulating layer 57 made from $SiO_2$ is formed in film thickness of approximately 1 μm to 4 μm by RF sputtering.

The Pt adhesion layer 59 of the fourth embodiment has high adhesion to the Au electrode layer 55, and is not to peel off from the Au electrode layer 55. Moreover, because the insulating layer 57 made from $SiO_2$ in thick film of, for example, approximately 1 μm to 4 μm is formed on the Au electrode layer 55 and the Pt adhesion layer 59, it has sufficient dielectric strength even when a voltage of a few volts to several tens of volts is applied. Therefore, when the on-board non-airtight sealing structure is applied, a short circuit between the signal electrode 42A and the ground electrode 42B can be prevented even if conductive impurities are adhered to a portion between the signal electrode 42A and the ground electrode 42B. That is, even for the on-board optical device 1, reliability is ensured without airtight sealing.

A case of applying to the signal electrode 42A and the ground electrode 42B of the DC-side child MZM 35C has been explained as an example, but it can also be applied to the signal electrode 41A and the ground electrode 41B in the RF-side MZM 34 and the signal electrode 43A and the ground electrode 43B in the DC-side parent MZM 36.

In the fourth embodiment, an example of forming the adhesion layer 59 by Pt has been explained, but instead of Pt, it can be formed by Ru, and appropriate alteration is possible. Ru can be used as an electrode having low electrical resistance, and in addition to its insusceptibility to corrosion by moisture in the air or the like, adhesion to an oxide, such as $SiO_2$, is higher than Au.

(e) Fifth Embodiment

Figure 7:
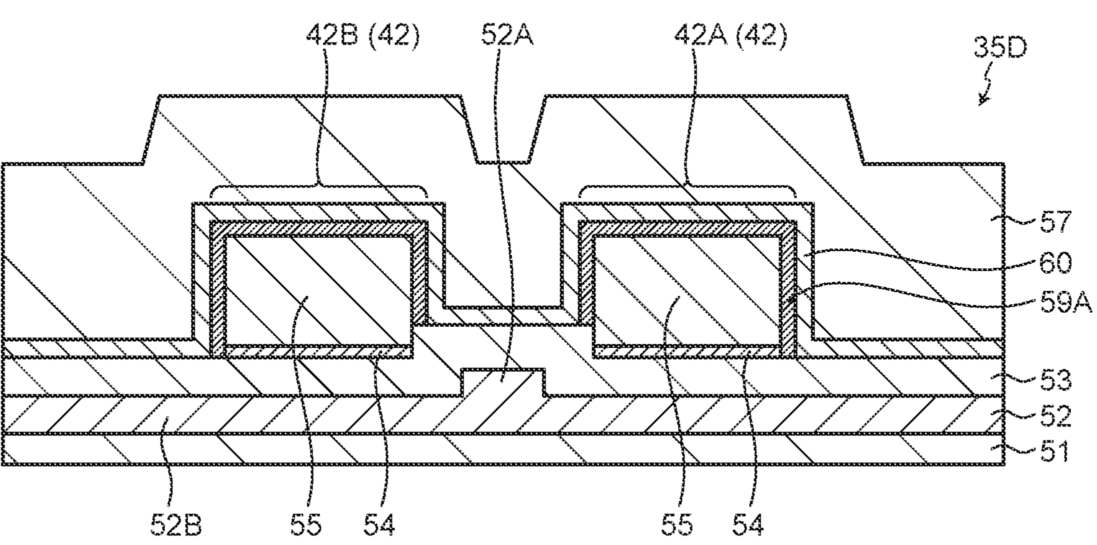
FIG. 7 is a cross-sectional schematic diagram illustrating an example of a DC-side child MZM of a fifth embodiment.

FIG. 7 is a cross-sectional schematic diagram illustrating an example of a DC-side child MZM 35D of a fifth embodiment. By assigning identical reference symbols to identical components to those in the optical device 1 of the fourth embodiment, explanation of duplicated configurations and actions will be omitted. What is different between the DC-side child MZM 35D illustrated in FIG. 7 and the DC-side child MZM 35C illustrated in FIG. 6 is a point in which an Ru adhesion layer 59A is formed on the surface of the Au electrode layer 55 formed on the buffer layer 53, and in which a water-vapor barrier layer 60 is formed on the RU adhesion layer 59A and the buffer layer 53.

Ru can be used as an electrode having low electrical resistance, and in addition to its insusceptibility to corrosion by moisture in the air or the like, adhesion to an oxide, such as $SiO_2$, is higher than Au. The Ru adhesion layer 59A can be easily formed selectively only on the Au electrode layer 55 and the electrode adhesion layer 54 of Ti by, for example, electroless plating.

Moreover, for example, an Ru film can also be formed by ALD by using ruthenium oxide ($RuO_4$) and a hydrogen gas as precursors. In this case also, because ALD gives preferable circumvention (step coverage), and the Ru film is to be formed sufficiently also on the side surface of the Au electrode layer 55.

Subsequently, similarly to the third embodiment, on the Ru adhesion layer 59A and the buffer layer 53, the water-vapor barrier layer 60 composed of $Al_2O_3$ is formed in film thickness of approximately 10 μm to 100 μm by ALD.

The Ru adhesion layer 59A of the fifth embodiment has high adhesion to the Au electrode layer 55, and is not to peel off from the Au electrode layer 55. Moreover, because the insulating layer 57 made from $SiO_2$ in thick film of, for example, approximately 1 μm to 4 μm is formed on the Au electrode layer 55 and the Ru adhesion layer 59A, it has sufficient dielectric strength even when a voltage of a few volts to several tens of volts is applied. Therefore, when the on-board non-airtight sealing structure is applied, a short circuit between the signal electrode 42A and the ground electrode 42B can be prevented even if conductive impurities are adhered to a portion between the signal electrode 42A and the ground electrode 42B. That is, even for the on-board optical device 1, reliability is ensured without airtight sealing.

Furthermore, because a film having low water vapor permeability formed by ALD is formed, effects of preventing adverse effects on the lifetime of DC drift due to moisture absorption in the buffer layer 53, and delamination due to oxidization or hydroxylation of the electrode adhesion layer 54 of Ti or the like can be obtained.

In the fifth embodiment, a case of forming the adhesion layer 59A by Ru has been explained as an example, but similarly to the fourth embodiment, it may be formed by Pt, and appropriate alteration is possible. Because the $Al_2O_3$ film is also an insulating layer, it can be used as a substitute for the $SiO_2$ film by making the $Al_2O_3$ film thick to approximately 1 μm to 4 μm. In this case, the insulating layer 57 of $SiO_2$ becomes unnecessary.

In the fifth embodiment, it is arranged in order, from the substrate, of the Au electrode layer 55, the adhesion layer 59A, the water-vapor barrier layer 60 composed of $Al_2O_3$, and then the insulating layer 57 composed of an $SiO_2$ film. However, because the $Al_2O_3$ film is also the insulating layer 57, it may be arranged in order, from the substrate, of Au, the adhesion layer 59A, the insulating layer 57 composed of an $SiO_2$ film, and then the water-vapor barrier layer 60 composed of $Al_2O_3$, and appropriate alteration is possible.

A case of applying to the signal electrode 42A and the ground electrode 42B of the DC-side child MZM 35D has been explained as an example, but it can also be applied to the signal electrode 41A and the ground electrode 41B in the RF-side MZM 34 and the signal electrode 43A and the ground electrode 43B in the DC-side parent MZM 36.

Figure 8:
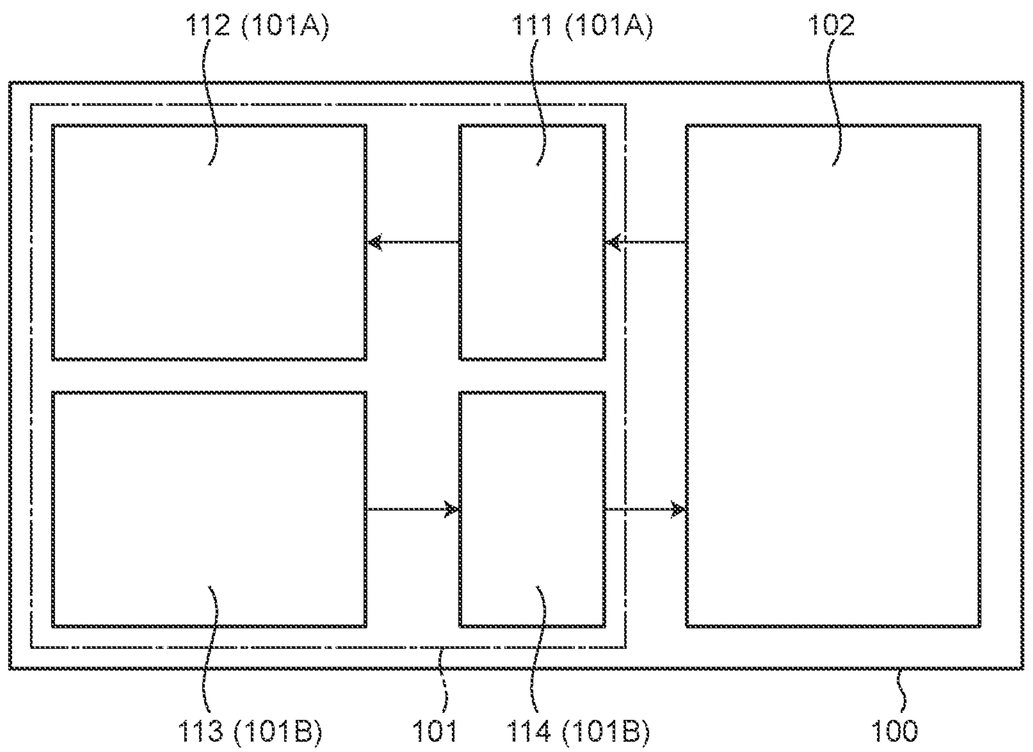
FIG. 8 is an explanatory diagram illustrating an example of an optical transceiver of the present embodiment.
Figure 9:
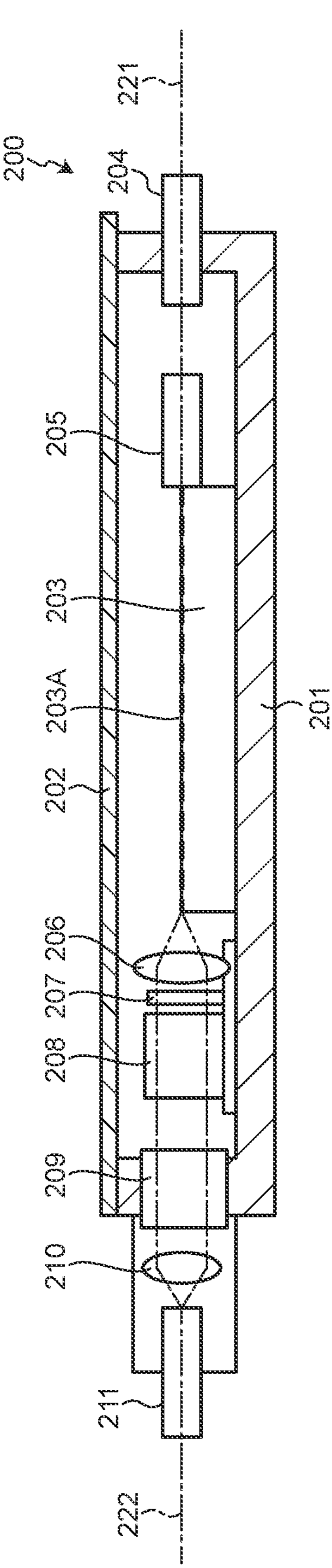
FIG. 9 is a cross-sectional schematic diagram illustrating an example of a conventional optical device.
Figure 10:
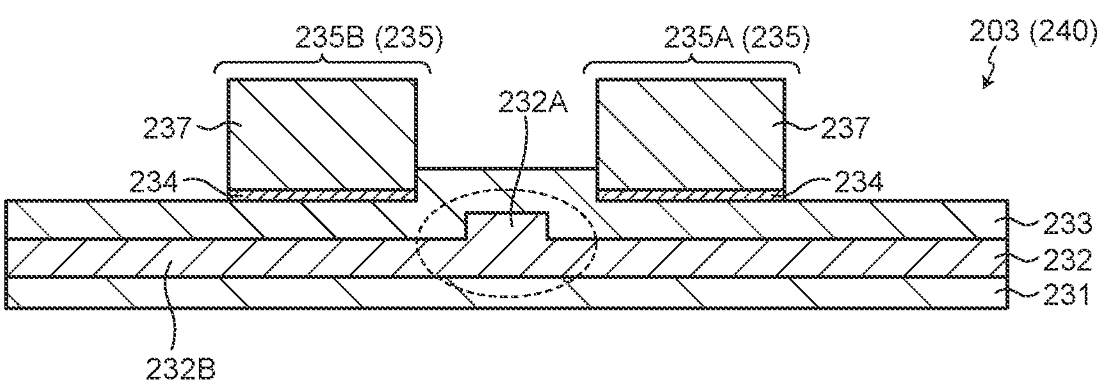
FIG. 10 is a cross-sectional schematic diagram illustrating an example of an MZM in a conventional optical modulator chip.

Next, an optical transceiver 100 in which the optical device 1 of the first to the fifth embodiments is adopted will be explained. FIG. 8 is an explanatory diagram illustrating an example of the optical transceiver 100 of the present embodiment. The optical transceiver 100 illustrated in FIG. 8 includes an optical transceiving device 101 and a digital signal processor (DSP) 102. The optical transceiving device 101 includes an optical transmitter 101A and an optical receiver 101B. The DSP 102 controls the entire optical transceiving device 101.

The optical transmitter 101A includes a driver circuit 111 and an optical modulator device 112. The driver circuit 111 drives the optical modulator device 112 in accordance with an electrical signal from the DSP 102. The optical modulator device 112 is an optical device of the present embodiment that optically modulates a signal light.

The optical receiver 101B includes an optical receiving device 113 and a transimpedance amplifier (TIA) 114. The optical receiving device 113 electrically converts a signal light. The TIA 114 amplifies the electrical signal subjected to electric conversion, and output the amplified electrical signal to the DSP 102.

The DSP 102 performs IQ modulation processing of a transmission signal, and demodulation processing of a reception signal. The modulated electrical signal from the DSP 102 is amplified by the driver circuit 111, and is input to the optical modulator device 112 as a high-speed analog driving signal. On the other hand, an electrical signal detected by the optical receiving device 113 is amplified by the TIA 114, and is input to the DSP 102 to be demodulated.

As an electro-optical material of the optical modulator device 112, for example, (Pb) (Zr, Ti) $O_3$ (PZT), (Pb, La) (Zr, Ti) $O_3$ (PLZT), $BaTiO_3$ (BTO), (Sr, Ba) $TiO_3$ (SBT), and the like can be used. However, as the electro-optical device, a perovskite oxide having other electro-optical effects may be used. In addition, a III-V compound semiconductor, such as Si, InGaAsP, and AlGaAsP, can be used also. When a III-V compound semiconductor, such as InGaAsP and AlGaAsP is used, because temperature sensitivity of the optical modulator is significant, a special thermos electronic cooler (TEC) having moisture resistance enabling application of a non-airtight sealing structure may be used by arranging a TEC under the optical transceiving device 101.

According to one aspect, reliability without airtight sealing is ensured.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising:

a substrate having an optical waveguide formed on a substrate surface;

a buffer layer that is laminated on the optical waveguide;

an electrode that is formed on the buffer layer;

an insulating layer that covers the electrode;

an adhesion layer that is formed between the electrode and the insulating layer; and a water-vapor barrier layer between the adhesion layer and the insulating layer.

2. The optical device according to claim 1, wherein the electrode includes Au as its material, and the adhesion layer includes any one of ZnS and a mixture of ZnS and $SiO_2$.

3. The optical device according to claim 1, wherein the electrode includes Au as its material, and the adhesion layer and the insulating layer include any one of ZnS and a mixture of ZnS and $SiO_2$.

4. The optical device according to claim 1, wherein the electrode includes Au as its material, and the adhesion layer includes any one of Pt and Ru.

5. The optical device according to claim 1, wherein the electrode includes Au as its material, and the water-vapor barrier layer includes ZnS and $SiO_2$.

6. The optical device according to claim 1, wherein the electrode includes Au as its material, and the water-vapor barrier layer includes $Al_2O_3$.

7. The optical device according to claim 6, wherein the water-vapor barrier layer is formed by $Al_2O_3$ by using atomic layer deposition.

8. The optical device according to claim 1, wherein the electrode includes Au as its material, and the water-vapor barrier layer and the insulating layer include $Al_2O_3$.

9. The optical device according to claim 1, wherein the electrode includes Au as its material, and the insulating layer is formed by $SiO_2$.

10. An optical transceiving device comprising:

an optical transmitter; and an optical receiver, wherein the optical transmitter includes a substrate having an optical waveguide formed on a substrate surface;

a buffer layer that is laminated on the optical waveguide;

an electrode that is formed on the buffer layer;

an insulating layer that covers the electrode;

an adhesion layer that is formed between the electrode and the insulating layer; and a water-vapor barrier layer between the adhesion layer and the insulating layer.

11. An optical transceiver comprising:

an optical transmitter;

an optical receiver; and a processor that performs signal processing of the optical transmitter and the optical receiver, wherein the optical transmitter includes a substrate having an optical waveguide formed on a substrate surface;

a buffer layer that is laminated on the optical waveguide;

an electrode that is formed on the buffer layer;

an insulating layer that covers the electrode;

an adhesion layer that is formed between the electrode and the insulating layer; and a water-vapor barrier layer between the adhesion layer and the insulating layer.

* * * * *